(12) United States Patent
Boyd

(10) Patent No.: US 11,565,892 B2
(45) Date of Patent: Jan. 31, 2023

(54) METHODS AND SYSTEMS FOR OPERATION OF A VACUUM TRANSPORT SYSTEM

(71) Applicant: Michael Boyd, Denver, CO (US)

(72) Inventor: Michael Boyd, Denver, CO (US)

(73) Assignee: TRANS-VAC SYSTEMS LLC, Denver, CO (US)

( * ) Notice: Subject to any disclaimer, the term of this patent is extended or adjusted under 35 U.S.C. 154(b) by 0 days.

(21) Appl. No.: 17/370,916

(22) Filed: Jul. 8, 2021

(65) Prior Publication Data

US 2022/0009727 A1   Jan. 13, 2022

Related U.S. Application Data

(60) Provisional application No. 63/049,339, filed on Jul. 8, 2020.

(51) Int. Cl.
   *B65G 53/04*   (2006.01)
   *B65G 53/66*   (2006.01)
   *B65G 53/36*   (2006.01)

(52) U.S. Cl.
   CPC ............. *B65G 53/04* (2013.01); *B65G 53/36* (2013.01); *B65G 53/66* (2013.01)

(58) Field of Classification Search
   None
   See application file for complete search history.

(56) References Cited

U.S. PATENT DOCUMENTS

| 2,572,862 | A | | 10/1951 | Israel |
| 3,490,813 | A | | 1/1970 | Hallstrom |
| 3,651,912 | A | * | 3/1972 | Rohner ............ E04F 17/12 193/34 |
| 3,689,010 | A | * | 9/1972 | Moritsovich et al. . B65G 51/26 406/185 |
| 3,788,338 | A | | 1/1974 | Burns |
| 3,853,355 | A | * | 12/1974 | Buisson ............ E04F 17/12 406/93 |
| 3,938,848 | A | | 2/1976 | Krambrock et al. |
| 3,951,461 | A | * | 4/1976 | De Feudis ............ B65F 5/005 406/10 |
| 3,953,078 | A | | 4/1976 | Aitken |
| 4,013,551 | A | | 3/1977 | de Feudis |

(Continued)

FOREIGN PATENT DOCUMENTS

| CN | 1361744 | 7/2002 |
| DE | 2340896 | 3/1974 |

(Continued)

OTHER PUBLICATIONS

U.S. Appl. No. 16/951,917, filed Nov. 18, 2020, Archambault.
U.S. Appl. No. 17/118,360, filed Dec. 10, 2020, Pollock.

*Primary Examiner* — Joseph A Dillon, Jr.
(74) *Attorney, Agent, or Firm* — Sheridan Ross P.C.

(57) ABSTRACT

Methods and system for waste collection and transport systems are provided. Systems of the present disclosure comprise at least one of a loading station and a chute providing a point of ingress for materials into a larger system. A plurality of vertical risers or branches are provided. The system and related methods generate a priority order of emptying loading stations based at least in part on loading stations that are provided on the same riser.

14 Claims, 3 Drawing Sheets

(56) References Cited

U.S. PATENT DOCUMENTS

| | | | |
|---|---|---|---|
| 4,076,321 A * | 2/1978 | Haight | B65F 5/005 |
| | | | 406/117 |
| 4,079,548 A * | 3/1978 | Zaccaria | E06B 5/16 |
| | | | 49/67 |
| 4,099,457 A | 7/1978 | Hyden | |
| 4,108,498 A | 8/1978 | Bentsen | |
| 4,111,315 A | 9/1978 | Hungerbach | |
| 4,155,851 A | 5/1979 | Michael | |
| 4,592,679 A | 6/1986 | Boiting et al. | |
| 4,827,415 A | 5/1989 | Gudat et al. | |
| 4,995,765 A | 2/1991 | Tokuhiro et al. | |
| 5,009,551 A | 4/1991 | Swartz | |
| 5,042,521 A | 8/1991 | Shiommi | |
| 5,215,412 A | 6/1993 | Rogoff et al. | |
| 5,882,149 A | 3/1999 | DeWitt et al. | |
| 5,954,078 A * | 9/1999 | Chiang | H01L 21/67075 |
| | | | 222/64 |
| 6,287,056 B1 | 9/2001 | Szikszay | |
| 6,322,295 B1 | 11/2001 | Gabriele | |
| 6,477,442 B1 * | 11/2002 | Valerino, Sr. | B65G 51/34 |
| | | | 414/730 |
| 6,565,284 B2 | 5/2003 | Gearhart | |
| 6,712,561 B1 * | 3/2004 | Valerino, Sr. | A61B 50/362 |
| | | | 406/197 |
| 6,786,681 B2 | 9/2004 | Grasshoff | |
| 7,326,005 B1 | 2/2008 | Castro et al. | |
| 7,886,402 B2 | 2/2011 | Kihlstrom | |
| 8,147,169 B1 | 4/2012 | Kvalheim | |
| 8,360,691 B2 | 1/2013 | Moretto | |
| 8,560,116 B2 | 10/2013 | Ojdemark | |
| 8,596,932 B2 * | 12/2013 | Hoganson | B65G 51/08 |
| | | | 406/197 |
| 9,073,706 B2 | 7/2015 | Arrabal et al. | |
| 9,302,849 B2 | 4/2016 | Forestier et al. | |
| 9,405,992 B2 | 8/2016 | Badholm et al. | |
| 9,540,187 B2 * | 1/2017 | Valerino, Sr. | B65G 51/42 |
| 9,549,784 B1 * | 1/2017 | Valerino, Sr. | A61B 50/362 |
| 9,725,253 B2 | 8/2017 | Embley | |
| 9,738,442 B2 * | 8/2017 | Pedersen | B65F 1/1623 |
| 10,843,879 B2 * | 11/2020 | Archambault | B65G 51/28 |
| 11,059,681 B2 * | 7/2021 | Lathan | H04W 88/085 |
| 11,078,711 B1 * | 8/2021 | Garrone, Jr. | E04F 17/12 |
| 2004/0025938 A1 | 2/2004 | Berry | |
| 2005/0236042 A1 | 10/2005 | Hansen | |
| 2010/0127090 A1 | 5/2010 | Tornblom et al. | |
| 2010/0218336 A1 | 9/2010 | Kihlstrom | |
| 2010/0307537 A1 | 12/2010 | Sundholm | |
| 2012/0321395 A1 | 12/2012 | Alfrost et al. | |
| 2013/0089380 A1 * | 4/2013 | Arrabal | B65F 5/005 |
| | | | 406/117 |
| 2013/0243536 A9 * | 9/2013 | Arrabal | B65G 51/00 |
| | | | 406/117 |
| 2015/0246773 A1 * | 9/2015 | Sundholm | B65G 53/56 |
| | | | 193/29 |
| 2016/0097206 A1 | 4/2016 | Embley | |
| 2016/0167898 A1 * | 6/2016 | Sundholm | B65F 5/005 |
| | | | 406/120 |
| 2017/0022008 A1 | 1/2017 | Tornblom | |
| 2017/0101275 A1 | 4/2017 | Embley | |
| 2018/0043347 A1 * | 2/2018 | Holtz | B01L 1/04 |
| 2019/0291974 A1 | 9/2019 | Archambault | |
| 2019/0374895 A1 | 12/2019 | Hidalgo Castado et al. | |
| 2021/0147163 A1 * | 5/2021 | Archambault | B65G 53/52 |
| 2021/0172629 A1 * | 6/2021 | Pollock | B65F 5/005 |

FOREIGN PATENT DOCUMENTS

| | | |
|---|---|---|
| EP | 2022731 | 2/2009 |
| WO | WO 01/05683 | 1/2001 |
| WO | WO 01/05684 | 1/2001 |
| WO | WO 2004/094270 | 11/2004 |
| WO | WO 2009/080885 | 7/2009 |

* cited by examiner

METHODS AND SYSTEMS FOR OPERATION OF A VACUUM TRANSPORT SYSTEM

This U.S. Non-Provisional patent application claims the benefit of U.S. Provisional Patent Application Ser. No. 63/049,339, filed Jul. 8, 2020, the entire disclosure of which is hereby incorporated by reference.

FIELD

The present disclosure relates generally to collection and transport systems. These systems include, but are not limited to vacuum waste collection systems. In some embodiments, the present disclosure relates to risers and loading stations for systems including but not limited to those used for transporting trash, linen, and recyclables.

BACKGROUND

Vacuum waste collection systems and similar systems (hereafter "systems") are useful for safely and efficiently transporting materials. Such systems are known to be used for transporting materials such as waste, linens, recycling, and other objects from point to point. The systems typically convey materials between different locations in a building, a development, or other interconnected space.

In various systems including, but not limited to vacuum waste collection and transport systems, entry points or "loading stations" are provided as a means of ingress for materials into the system. In some embodiments, loading stations are connected to and feed material to a storage chamber or chute. The storage chamber or chute receives, and occasionally stores materials prior to delivery of the materials into a transport pipe. Vacuum collection systems and chutes are commonly used in commercial buildings like hospitals, apartments, etc. to transport waste, recycling and/or dirty linens.

Systems with risers may comprise air movers and related equipment including, for example, a fan, damper, and/or valve associated with each riser. Such equipment and hardware is often specific to each riser and generic to all stations provided on the riser. In other words, the air moving components and system of each riser must be activated regardless of whether a single loading station on a riser is to be emptied, or if a plurality of loading stations on a single riser are to be emptied. Additionally, the activation and initiation of such air moving features comprises time and energy. However, known systems are not concerned with system efficiencies associated with activating riser features with a prioritized transaction order to minimize spooling up and down of system components.

SUMMARY

There has been a long-felt but unmet need to provide methods and systems for managing a vacuum transport system, including providing an ordered and efficient emptying of stations within such systems. There has further been a need to provide a method and system for ordered and efficient emptying of loading stations that are provided within two or more risers or other branches of a system.

In various embodiments, systems are provided that comprise a plurality of risers. As used herein, the term "riser" generally refers to a vertically extending portion or segment of transport piping that is operable to receive and transmit waste or other materials between floors or levels of a structure that are distributed in a vertical arrangement. While various embodiments contemplate that risers extend in a substantially vertical direction and extend between at least two floors or levels of a building, it will be recognized that the present disclosure is not limited to such embodiments. Specifically, aspects, features and methods of the present disclosure are contemplated as being useful with risers that are not purely vertical in their orientation and/or with sections of piping that extend in a substantially or partially horizontal direction. Preferred embodiments of the present disclosure, however, contemplate systems and methods of emptying risers that extend vertically.

In various embodiments, systems are provided within a multi-story building and the systems comprise risers that extend between at least two of the stories. A loading station or similar point of ingress for materials is provided on at least two of the stories. Systems and methods of the present disclosure detect whether or not multiple transactions are present on one riser. The transaction(s) may include, for example, material that has been provided within a loading station, but has not yet been released or conveyed to further points within the system. An example of a loading station that is operable to receive materials and await further command before emptying the material into the system include, for example, stations shown and described in U.S. Patent Application Publication No. 2019/0291974 to Archambault, which is hereby incorporated by reference in its entirety. If the system detects and/or determines that multiple transactions are present on at least one riser, the system may order the multiple transactions. In some embodiments, the system orders the emptying operations in a bottom-to-top manner (i.e. the system provides an order wherein stations on a first or lower story or floor are to be emptied prior to emptying a station on a second floor, then a third floor, etc.). In some embodiments, the system orders the emptying operations in a top-to-bottom manner (i.e. the system provides an order wherein stations on an upper floor or story are to be emptied prior to emptying a station on a lower floor).

In further embodiments, the order in which stations on a single riser is not material to the invention. In some embodiments, a plurality of stations on a riser are emptied based on one or more of fill level, usage (e.g. door activity), and order or timing of loading. It is also contemplated that systems and methods of the present disclosure provide for emptying a plurality of loading stations wherein a plurality of risers each comprise only a single station on a riser.

Emptying of a first station in accordance with systems and methods of the present disclosure preferably comprises: (i) confirming that the first station is ready for emptying (e.g. an outer door of the station is closed); (ii) opening an inner door of the first station and allowing contents to empty into the transport piping; (iii) closing the inner door; (iv) removing the first station from the queue or order. The system and method then advances to the next vertically highest station in the same riser and preferably performs the same sequence of events to empty that second station and continues in this manner vertically upwardly until the stations that require emptying on that riser are cleared. The system then selects a second riser with multiple pending transactions and performs the aforementioned method of emptying vertically distributed loading stations on that riser. If no further risers of the system comprise multiple pending transactions, the system selects a riser with only a single pending transaction and empties that station. In some embodiments, when the system enters "single station" emptying mode, the stations are preferably emptied based on which stations were first loaded into the system.

In some embodiments, systems and methods of the present disclosure are configured or configurable to refrain from emptying a loading station on a specific riser when only a single loading station of a plurality of loading stations on that riser is awaiting emptying. In these embodiments, a user may over-ride this default setting or feature. For example, in such embodiments, where a system declines or is configured to decline emptying a loading station on a riser where that station is the only station awaiting emptying, a user may enter credentials on or associated with the loading station to indicate that this default setting should be overridden and the station should be emptied. This over-ride feature is contemplated to allow a user to force the station to empty when further contents need to be loaded into the single station and waiting for other stations on that riser to be filled is not a desirable option.

Typically, loading stations on a specific riser are discrete and individual points of entry for the system but are interconnected based at least on their shared transport piping. In various embodiments of the present disclosure, loading stations on a single riser comprise a shared pathway or piping as well as a shared air mover. For example, it is contemplated that at least some risers are provided with a fan or air mover that common to the entire riser and must be activated for emptying loading stations on that riser, regardless of whether one or multiple stations on that riser require emptying. Systems and methods of the present disclosure provide for enhanced efficiencies including operational and energy efficiencies. For example, systems and methods of the present disclosure comprise identifying and ordering multiple loading stations that require emptying. The identification and ordering of the present disclosure allows for more efficient operation of systems and prevents or reduced, for example, unnecessary cycling and activation of system components such as air movers. In various existing system, loading stations of transport systems are emptied based on a simple priority basis. In other words, loading stations are known to be emptied based on which stations were loaded or ready for emptying first, regardless of whether or not this required multiple activations of an air mover on a riser when a single activation would have been sufficient.

In addition to energy inefficiencies and potential unnecessary wear on a system, prior art systems and their associated switching of airflow also causes delays. For example, in order to switch from an emptying operation on a first riser to that of a second riser, several events must occur. For example, for each transaction, a damper of a riser must be opened, fans ramped up, airflow is monitored, a station is emptied, maintain fan speed, and confirm material has been transferred to a collector (or at least allow sufficient time for this to occur), before moving to a next riser/station. Switching between risers therefore could require an amount of time to elapse that causes delays and bottlenecks particularly during times of heavy usage and/or in larger systems.

Loading stations of the present disclosure are contemplated as comprising an outer door, an inner door, and a throat or holding chamber provided therebetween. It is contemplated that users may open an outer door multiple times before materials are emptied through the inner door. Outer door opening and closing (i.e. use) can therefore indicate an increased need or urgency to empty that particular station and/or the entire riser. Accordingly, embodiments of the present disclosure contemplate the ordering and optimization of riser and/or station emptying based on one or more factors and inputs as described herein.

In certain embodiments, an outer door of at least one loading station is in communication with the system (e.g. via a controller). The system is operable to monitor and track or log the occurrences of an outer door opening, and to output a signal to the system to empty that station or riser. In some embodiments, methods of emptying risers as shown and described herein include a step of creating an order in which risers are to be emptied and wherein the order is created at least in part based on data related to outer door use.

In further embodiments, systems and methods of the present disclosure are operable to sense a fill level of one or more loading stations. Systems and methods as shown and described herein are contemplated as providing an ordered emptying of a plurality of risers and/or stations and wherein the order is created by the system based at least in part on one or more stations in a riser comprising or exceeding a predetermined fill level. Methods and devices for determining fill level in a station are shown and described in U.S. Pat. No. 9,725,253 to Embley, which is hereby incorporated by reference in its entirety. Various level sensors are contemplated. For example, airflow sensors, optical sensors, and load cells are all contemplated as being operable to sense fill levels in various embodiments of the present disclosure.

In some embodiments, one or more stations are provided with the ability to determine and sense a fill level of at least one station. It is contemplated that methods, systems and devices of the present disclosure are operable to detect a fill level of a throat or holding chamber of one or more stations (as a percentage, for example) and create an ordered emptying of risers wherein risers with the greatest fill level(s) are emptied first. In some embodiments, systems are provided that are operable to determine an average fill level of a plurality of stations in a plurality of risers, and create and execute an ordered emptying of risers based on the highest average (e.g. mean) fill level.

In some embodiments, systems and methods of the present disclosure comprise features and abilities to allow a user to assign or request elevated priority for a station or a riser. For example, in some embodiments, it is contemplated that a load station comprises a button or similar user-interface available to and accessible by a user. If, for example, a user opens an outer door and visually determines that the station is full, the user may activate the button or user-interface to provide a signal to the system that at least one of the station and the riser on which that station is located require prioritized emptying. In some embodiments, systems of the present disclosure assign an order in which risers are to be emptied based on a number or count of signals from users that a station (or stations on a riser) require emptying. If, for example, a first riser or branch has provided X signals from users to the system and a second riser or branch has provided Y signals from users to the system, and X is greater than Y, the system will empty the first riser before emptying the second riser. In some embodiments, where X equals Y, the system creates a priority and order for risers to be emptied based on at least one additional input (e.g. fill-level or station/riser use information). It is also contemplated that a button or interface need not necessarily be provided on the station. In some embodiments, for example, an input or signal is provided by a user through a smartphone or tablet device to convey information to the system that a station is full. In some embodiments, a QR code is provided on an exterior of a load station, and a user can scan the code with a handheld device to indicate a full condition (or provide further information to the system such as a "service required" input).

Methods and systems of the present disclosure contemplate an ordered and prioritized emptying of risers and/or specific stations. It will be recognized that methods, systems and devices contemplated and described herein for creating an order of emptying risers is contemplated as being applied to a specific station and vice versa.

Systems of the present disclosure contemplate and provide the ability to generate or create a priority of certain risers and a corresponding sequence or order in which stations on a given riser are emptied or cleared. Priority status of a riser (or, in some embodiments, a station) is assigned or created based on at least one of: which riser comprises the most stations with at least some material awaiting emptying; which riser comprises one or more stations that are full (and/or which riser comprises the most "full" stations); which riser comprises stations with the most use (e.g. which riser comprises stations that have been unlocked or used most often within a given amount of time); which riser has one or more stations that are pre-coded or pre-programmed with a priority status; which riser has been pre-coded or pre-programmed with a priority status; which riser comprises a station that has been assigned a priority by a user; and/or which riser comprises the most total stations (regardless of fill level). In some embodiments, the order in which stations and/or risers are emptied is determined by the system using a combination of at least two of the above factors. For example, in some embodiments, systems of the present disclosure are operable to create and assign a value to a riser. A "riser score" is contemplated as being assigned to a riser wherein the "riser score" is based on a plurality of factors. In one such embodiment, for example, a riser score ("RS") is determined by assigning a value for each of a plurality of factors and summing the score for each factor. For example, a number can be assigned based on fill level of a station (e.g., full=5, 50% full=3, <20% full=1), priority assigned by a user (e.g., user-inputted 5, 4, 3, 2 or 1), priority assigned by the system based on user type (e.g., emergency room worker=5, support staff=2), usage of a station (e.g. frequent use=5, etc.). The same logic can be applied to stations and risers. Additionally, riser or station priority is contemplated as being weighted. In some embodiments, for example, a factor is provided with a multiplier prior to summing the scores of the various criteria. If, for example, fill level is deemed to be most important, the score of that criteria or factor may be multiplied by a value (e.g. 3) prior to summing the score to determine a RS.

In various embodiments of the present disclosure, systems are provided that contemplate and account for the possibility that a plurality of risers or stations are assigned the same "value" or priority. In such situations, systems of the present disclosure are contemplated as comprising a "tie-breaker" feature based on one or more conditions. For example, where two or more risers are assigned the same priority value by the system, the system is further operable to determine this equivalent value and rank or prioritize the risers based on a temporal value in which station(s) were loaded. For example, the system contemplates that a time of day in which a station door is opened or closed is logged within the system with accuracies up to one one-hundredth of a second. The station that was opened or closed first may be used as a tie break. One of ordinary skill in the art will recognize that in such a "tie break" situation, various conditions may be used to determine priority. Accordingly, such embodiments are not limited to using time stamps of loading stations as criteria.

In some embodiments, systems of the present disclosure comprise artificial intelligence or machine learning features whereby the system is operable to update or adjust its own evaluation criteria based on use, etc. For example, in some embodiments, the system comprises an algorithm that logs, stores, and evaluates various factors. For example, systems of the present disclosure are contemplated that are capable of re-assigning priority values or default settings to emptying orders based on user inputs. If, for example, one or more users regularly override or change a priority setting or emptying sequence that has been established by the system, the system is operable to evaluate the factors and conditions of one or more risers or stations and alter its methods.

In various embodiments, systems are provided wherein one or more portions of a system (e.g. risers or stations) are operable to be provided with a manually-input or coded designation or priority. Some embodiments of the present disclosure contemplate assigning a portion of a system (e.g. a riser, an area of a hospital, a particular floor, a wing, etc.) with a preset priority and determining the priority or order of additional parts of the system or facility based on methods described herein. For example, systems of the present disclosure may be provided in a hospital and an "Emergency Room" portion of the hospital system may be provided with a default highest priority, and additional zones, areas, risers, floors, etc. of the system are assigned an order for emptying that are subservient to the Emergency Room. In this example, the Emergency Room area will be emptied first regardless of fill level or door usage (for example), and other areas of the system will be provided with a structured or ordered emptying based on such conditions, inputs, and methods and systems described herein. It will be recognized that various portions of a system may thus be isolated or programmed separately from other portions of a system.

Various embodiments of the present disclosure contemplate and provide for one or more risers that comprise a plurality of stations on each riser. In some embodiments, it is contemplated that a riser comprises more stations than can or should be emptied in a given emptying operation. For example, risers are contemplated that comprise twenty or more loading stations on the riser. For various reasons, and as will be recognized by one of ordinary skill in the art, it is undesirable or impossible to empty an entirety of the stations or even a majority of the stations in a given emptying operation. It may be desirable, for example, to empty no more than six loading stations on a riser that comprises twenty loading stations. If and when more than six stations (e.g. ten stations) comprise materials, it is thus necessary to select and priority the six that are to be emptied during an emptying operation. Systems of certain embodiments of the present disclosure comprise the ability to determine which stations comprise materials, and further comprise the ability to select or identify six (for example) stations that are to be prioritized. Priority is assigned by any one or more of the criteria described herein including, for example, station fill level; which station has experienced the most use (e.g. which station has been unlocked or used most often within a given amount of time); which station has been pre-coded or pre-programmed with a priority status; which station has been assigned a priority by a user. Although certain embodiments contemplate emptying fewer than all stations on a riser at a given time and further prioritizing or identifying which stations are to be emptied, the present disclosure is not limited to such embodiments. It is contemplated, for example, that certain systems are capable of emptying all stations on a riser either due to a small number of stations being provided on a riser and/or the size and specifications of a system being such that it can empty numerous stations within a small amount of time.

Various embodiments of the present disclosure contemplate an intervening loading of a station during an emptying operation. For example, it is contemplated that while a riser is undergoing an emptying operation wherein certain stations are being emptied or evacuated, a further station (not initially identified by the system for emptying) is provided with materials. Systems of the present disclosure are contemplated as being capable of evaluating this intervening event and determining whether or not the "new" materials and the additional station are to be emptied along with the stations initially identified and selected for emptying. In some embodiments, systems of the present disclosure comprise and perform a determining step that determines if the number of stations that have been selected for emptying on a given riser is less than a maximum allowable number of stations than can be emptied in one emptying operation, the new or additional station is included in the emptying operation. If the number of stations selected for emptying in one operation is equal to the maximum allowable number of stations to be emptied in a single operation, systems of the present disclosure are contemplated as performing additional analysis to determine how the new materials and additional station are to be handled. The system must determine, for example, whether the new materials and station are to be held in reserve for further emptying operations or if they are to be emptied and one or more of the initially identified stations is to be removed from the emptying operations. In some embodiments, systems comprise the ability to replace a station to be emptied with a new station when the new station is identified as having a higher priority. For example, if a new station has been identified as having a high priority by one or more factors described herein (e.g. type of user, user-input priority, etc.) and another station already selected for emptying does not comprise a high priority, the system is operable to and capable of replacing the pre-selected station with the new station.

Systems and embodiments of the present disclosure are contemplated as handling one or more material streams. For example, various systems and embodiments of the present disclosure are contemplated as comprising waste management systems that handle trash (of varying types), recycling (of varying types), linens, carriers, and any number of other materials. Embodiments of the present disclosure contemplate identifying stations based on material type and evaluating and assigning priority based on the material type. In some embodiments, for example, systems of the present disclosure are contemplated as prioritizing "red bag" waste over recyclables even if the recyclables are loaded earlier in time and/or a station comprising recyclables is full.

Although various embodiments of the present disclosure contemplate providing systems and prioritization of certain risers relative to other risers, it is also contemplated that embodiments and features of the present disclosure are operable for use with systems and structures that comprise as few as one risers. In such embodiments, it is contemplated that a singular riser of a structure or facility comprises a plurality of loading stations. The loading stations are contemplated as being provided with a priority and an emptying sequence as shown and described with respect to the various embodiments and features provided herein. For example, risers may be emptied in an order established by the system. The order may be established by any one or more of: fill level, frequency of use, type of material in the station (e.g. as indicated by a user), pre-programmed status of a station, type of user (e.g. as identified by an access code or card associated with a user), and other conditions or status identifiers disclosed herein.

In one embodiment, a method of operating a transport system is provided. The method comprises a plurality of risers and transport piping connecting the risers to a central collection point, and wherein at least one of the plurality of risers comprises a plurality of loading stations. The method comprises a step of identifying a number of loading stations that comprise materials to be conveyed to the central collection point; determining whether at least one loading stations on a first riser comprises materials to be conveyed; determining whether at least one additional loading station provided on a second riser comprises materials to be conveyed; generating an order in which the loading stations that comprise materials to be conveyed are to be emptied, and wherein the order comprises grouping loading stations on the first riser prior to loading stations on the second riser when the first riser comprises a plurality of loading stations to be emptied; activating conveyance features of the first riser; opening inner doors of the loading stations of the first riser in a sequence until the at least one loading station of the first riser is cleared; deactivating the conveyance features of the first riser; activating conveyance features of the second riser; and deactivating the conveyance features of the second riser upon confirming that the loading station of the second riser has been cleared.

In one embodiment, a collection and transport system comprising is provided. The system comprises a plurality of vertically extending risers and wherein at least one of the plurality of risers comprises an air mover. Transport piping connects the risers and a central collection point. At least one of the plurality of risers comprises a plurality of loading stations. A processor is provided that is operable to receive information and determine loading stations that comprise materials to be conveyed to the central collection point and generate an order in which the plurality of loading stations are to be emptied. A controller is provided and is operable to communicate with the air mover and a plurality of loading stations and the processor and the controller are configured to generate and send the order in which a plurality of loading stations are to be emptied and the order comprises grouping loading stations on a single riser.

In one embodiment, a method of operating a transport system is provided wherein the system comprises a plurality of loading stations, transport piping, and a collection point. The method comprises determining whether at least one loading station comprises materials to be conveyed; determining whether at least one additional loading station comprises materials to be conveyed; generating an order in which the loading stations are to be emptied, and wherein the step of generating the order is based on at least one of fill level, a user-input, a user-type, a predetermined station type, frequency of use, and a type of material; activating conveyance features; emptying the loading stations in sequence based on the order; and deactivating the conveyance features upon confirming that the loading stations have been cleared.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

DETAILED DESCRIPTION

Figure 1:
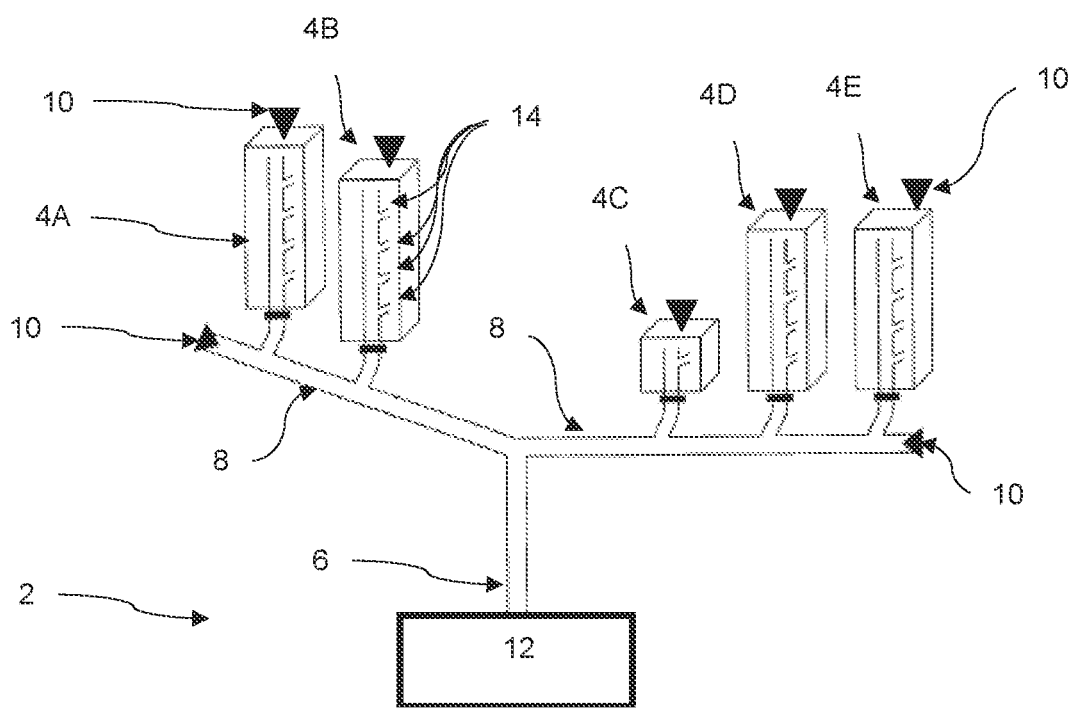
FIG. 1 is a diagram of a system according to one embodiment of the present disclosure.

FIG. 1 is a diagram of a system 2 according to one embodiment of the present disclosure. As shown, the system 2 comprises a plurality of risers 4A-4E. The risers 4 generally comprise a vertical distribution of loading stations that extend between multiple floors or levels of a building. The risers 4 may be distributed through a single structure (e.g. a hospital) or may comprise risers that are distributed throughout a larger system (e.g. a college campus or office park). Each riser comprises at least one and preferably a plurality of loading stations or similar entry points 14 for material that is to be transported. Material is ultimately contemplated as being transported from entry points 14 of the riser to a central collection point 12 via transport piping. A main conduit 6 is shown, as are multiple branches 8 interconnecting the risers. However, no limitation with respect to system size and/or layout is provided herewith. Risers 4 are contemplated as comprising an entry point 14 on each floor or level to which the riser extends. Risers may comprise as few as one loading station (4C, for example), and no limitation with respect to a maximum number of risers is provided.

Existing systems generally empty stations of risers on a "first-in-first-out" basis. In other words, if material is loaded in a station 14 on a first floor of a riser 4B, a second floor of a second riser 4D, and a third floor of the first riser 4B, an emptying sequence is conducted comprising the steps of: activing air movers and emptying sequences of the first riser 4B to evacuate the station on the first floor of the first riser 4B; deactivating the air movers and sequences of the first riser 4B, activating air movers and emptying sequences of the second riser 4D to evacuate the station on the second floor of the second riser; deactivating the air movers and sequences of the second riser 4D; and reactivating the air movers and emptying sequences to evacuate the station on the third floor of the first riser 4B. This method and the associated "switching" between risers has been identified by the Applicant as providing unnecessary delays and bottlenecks within a system.

Embodiments of the present disclosure provide methods and systems for emptying a plurality of loading stations 14. Systems and methods of the present disclosure comprise one or more controllers, processors, sensors, and a central processing unit that is operable to determine at least one of the present of material in a loading station and a loading station's readiness or need to be emptied. Based on the presence of material and/or a station's readiness to be emptied, the system 2 creates an order of emptying of operations wherein stations on a common riser are prioritized or grouped. For example, if a plurality of stations 14 on a riser 4B require emptying and at least one station 14 on another riser 4E (for example) also requires emptying, the system creates an emptying order wherein all stations 14 on the first riser 4B are to be emptied prior to conducting emptying operations on the second riser 4E, even if the station 14 of the second riser 4E was made ready for emptying prior to one of the stations on the first riser 4B. In contrast with prior art systems, the temporal relationship of when stations were loaded is not the only factor in the system's determination of the order in which stations are to be emptied. In the described embodiment, the system creates and provides commands via a controller and processor to empty the multiple stations on the first riser 4B by activating air moving features of the riser 4B and empties the stations in the riser 4B by sequentially opening inner doors of the stations beginning with a lowermost station and proceeding upwardly. Once the first riser 4B is cleared, the system then deactivates air moving features of the first riser 4B and initiates an emptying of the station(s) 14 provided on the second riser 4E. Such methods and systems provide for reductions in cycling of various equipment (e.g. fans, dampers, etc.) and associated delays and inefficiencies.

As shown in FIG. 1, air movers 10 are contemplated as being provided at various locations throughout the system 2. Preferably, air movers 10 including fans and dampers are provided in each riser 4. It is further contemplated that air movers 10 may be provided at the ends of branches in a system.

Various sensors and sensing equipment are contemplated for use with embodiments of the present disclosure. In order for systems of the present disclosure to determine which stations are ready or in need of emptying, one or more sensors or features are provided in communication with the system. In some embodiments, a signal is provided by the station itself that an outer door is closed and the station is ready to be emptied. The signal may be generated by a user input and/or various fill-level sensors that are operable to detect that the station comprises material.

In one embodiment, a method of operating a waste collection and transport system is provided. The method comprises a plurality of risers and transport piping connecting the risers to a central collection point. At least one of the plurality of risers comprises a plurality of loading stations. A number loading stations are identified that comprise materials to be conveyed to the central collection point. The system and method determine whether a plurality of loading stations exist on a first riser and comprise materials to be conveyed to a central collection point. The system and method determine whether at least one additional loading station provided on a second riser comprises materials to be conveyed. An order is generated in which the loading stations that comprise materials to be conveyed are to be emptied, and wherein the order comprises grouping loading stations on the first riser (having multiple stations to be emptied) prior to emptying loading stations on the second riser. One or more conveyance features (e.g. a fan, damper, or valve) of the first riser are activated, and inner doors of the loading stations of the first riser are opened in a sequence until the loading stations of the first riser are cleared. The conveyance features of the first riser are deactivated, and conveyance features of the second riser are activated. Conveyance features of the second riser are deactivated upon confirmation that the loading station of the second riser has been cleared.

In various embodiment, systems are provided. In one embodiment, a vacuum waste collection system is provided that comprises a plurality of vertically extending risers. At least one of the plurality of risers comprises an air mover. Transport piping is provided that connects the risers and a central collection point. At least one of the plurality of risers comprises a plurality of loading stations. A processor is provided that is operable to receive information and determine loading stations that comprise materials to be conveyed to the central collection point and generate an order in which a plurality of loading stations is to be emptied. A controller is provided that is operable to communicate with the air mover and a plurality of loading stations. The processor and the controller are configured to generate and send the order in which a plurality of loading stations are to be emptied, and the order comprises grouping loading stations on a single riser.

The stations 14 and risers 4 of FIG. 1 are contemplated as being assigning a priority and emptying order based on one or more of the various factors disclosed herein. Various embodiments of the present disclosure contemplate emptying a plurality of stations 14 on a specific riser 4 and minimizing switching between risers to increase system efficiencies and decrease unnecessary cycling or fans and air movers. The specific order and sequence in which risers 4 are to be emptied is contemplated as being calculated and determined by systems of the present disclosure based on at least one of: which riser comprises the most stations with at least some material awaiting emptying; which riser comprises one or more stations that are full (and/or which riser comprises the most "full" stations); which riser comprises stations with the most use (e.g. which riser comprises stations that have been unlocked or used most often within a given amount of time); which riser has one or more stations that are pre-coded or pre-programmed with a priority status; which riser has been pre-coded or pre-programmed with a priority status; which riser comprises a station that has been assigned a priority by a user; and/or which riser comprises the most total stations (regardless of fill level). In some embodiments, the order in which stations and/or risers are emptied is determined by the system using a combination of at least two of the above factors. Additionally, within a given riser 4, stations 14 are contemplated as being assigned a priority or order. Station priority is contemplated as being calculated by any one or more of the criteria described herein including, for example, station fill level; which station has experienced the most use (e.g. which station has been unlocked or used most often within a given amount of time); which station has been pre-coded or pre-programmed with a priority status; which station has been assigned a priority by a user. Various embodiments, systems and methods for evaluating stations and risers, and creating a related emptying sequence described in the Summary are incorporated herein by reference and are contemplated as being applied to the system of FIG. 1, 2 or 3.

Figure 2:
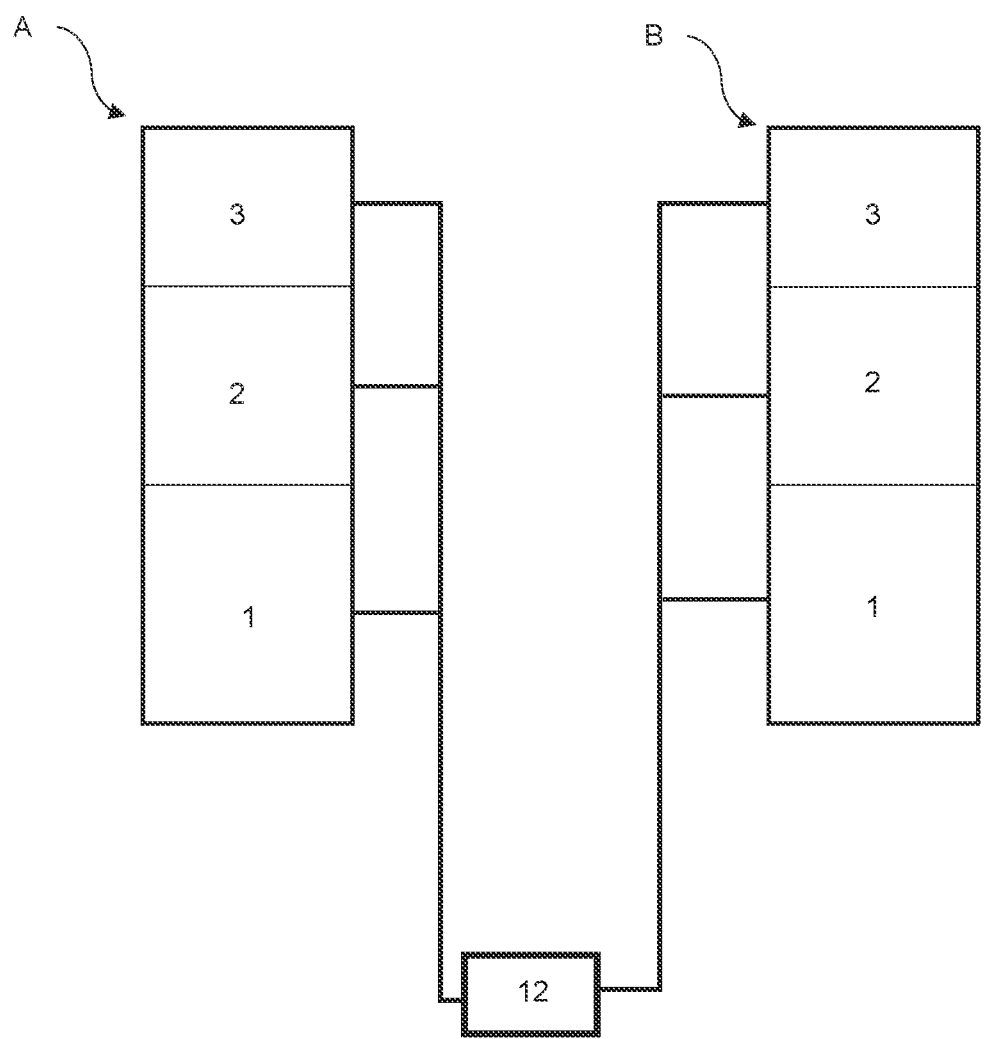
FIG. 2 is a schematic of a system according to one embodiment of the present disclosure.

FIG. 2 is a simplified diagram of a system according to various embodiments of the present disclosure. For illustration and explanation purposes, two risers A, B are shown in FIG. 2. The risers A, B are connected to and operable to convey materials to a central collection point 12. Each riser is shown as comprising three levels (1, 2, 3) and each level is contemplated as comprising a loading station. Accordingly, six stations A1, A2, A3, B1, B2, B3 are provided. According to various prior art systems and methods, stations are emptied in an order corresponding to the order in which material were provided in a loading station. For example, if materials were placed in loading stations and the stations were ready for emptied in a temporal order described as A1→B2→A3, the risers and stations would be activated and materials would be emptied to the central collection point 12 in the same order. This would require riser A to be activated and shut down before activating and deactivating riser B, and subsequently reactivating riser A (to empty A3). According to embodiments of the present disclosure, systems and methods contemplate providing logic and control systems that provide and enable an ordered emptying wherein under the same loading sequence (A1→B2→A3), the stations are emptied in a sequence that is preferably described as A1→A3→B2. Such systems and methods provide for enhanced efficiencies by preventing equipment and features from needing to unnecessarily cycle. In the described embodiment, for example, riser A would only need to be activated once as opposed to twice. Such embodiments provide various improvements at least in terms of efficiency.

As previously described, the system may create an order for emptying stations or risers based on various additional conditions. For example, and with further reference to FIG. 2, if station B2 has been used (e.g. opened and closed) a certain amount of times within a predetermined amount of time, and that usage information indicates that B2 has been used more than at least one station on riser A, the system is contemplated as prioritizing the emptying of riser B. Similarly, a fill level of a single station or an average fill level of a riser is contemplated as being exported to a processing unit of the system, and the system creates and outputs a priority based on that fill level. If for example, an average (mean) fill level on riser A is less than the average fill level of riser B, riser may be prioritized and emptied first. Similarly, multiple stations on riser A may comprise an amount of material to be emptied, but a single station on riser B is 98% full. Such a condition is detected by the system and the system outputs a signal to prioritize the emptying of riser B. Additionally, and as previously described, user-inputs may be provided to create or alter a sequence and order in which risers and/or stations are to be emptied.

Figure 3:
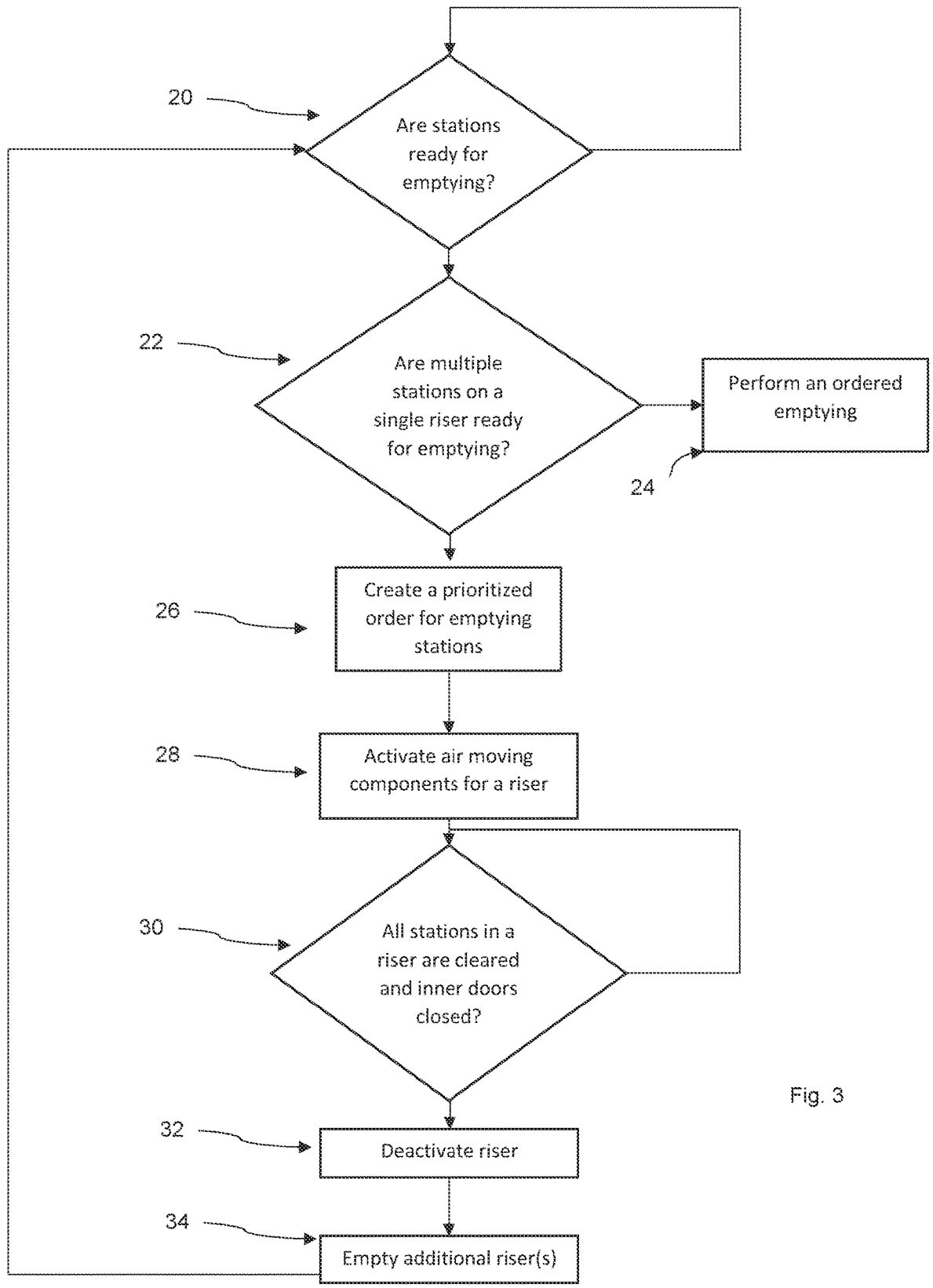
FIG. 3 is a flow chart illustrating a method of operating a system according to one embodiment of the present disclosure.

FIG. 3 is a flowchart depicting a process according to one embodiment of the present disclosure. As shown, an initial monitoring step 20 is provided wherein a system is actively monitoring for stations to be provided with materials and ready for emptying. Stations are preferably connected to a processor and controller of the system through at least one of fill-level sensors and manual (user) inputs to indicate to the system when the station comprises materials and requires emptying. If no stations in a system are prepared for emptying, the system continues to monitor for the condition to be satisfied. If at least one station is ready for emptying, the process advances to step 22 wherein the system and processor determine whether or not multiple stations on a single riser are ready for emptying. If not, the system is operable to create an ordered emptying (step 24). This ordered emptying is contemplated as comprising emptying stations on different risers in the order in which they were loaded. Alternatively, if multiple stations are ready for emptying and at least two of those stations exist on a single riser, the system advances to step 26 wherein the processor creates a prioritized and ordered emptying sequence. Preferably, that sequence comprises aggregating or ordering stations on a single riser to be emptied in sequence. In some embodiments, this comprises emptying a lowermost station on a first riser and moving vertically upwardly on that riser, emptying stations as needed before moving to emptying operations on another riser. In some embodiments, a time stamp or similar information is provided to the processor and/or controller, and the system is operable to observe the time stamp information but prioritize emptying of stations on a common riser despite the time stamp information (and as opposed to simply performing a "first-in, first-out") emptying. Once the prioritized order of step 26 is created, a riser is activated at step 28. In various embodiments, activating a riser comprises initiating or activating air moving equipment (a fan, valve, and/or damper, for example) that is common to all stations on the riser. The method then advances to a further monitoring step 30 wherein system is operable to detect and confirm that all stations requiring emptying have been cleared and inner doors are closed (for example). Once this is confirmed, the riser is deactivated at step 32. Where needed, additional risers are emptied (step 34) in substantially the same manner. If all stations have been cleared, the system preferably returns to the initial monitoring state (step 20).

It is to be understood that the disclosure is not limited to particular methods or systems, which can, of course, vary. It is also to be understood that the terminology used herein is for the purpose of describing particular embodiments only and is not intended to be limiting.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method of operating a transport system comprising a plurality of risers and transport piping connecting the risers to a central collection point, and wherein at least one of the plurality of risers comprises a plurality of loading stations:
    identifying a number of loading stations that comprise materials to be conveyed to the central collection point;
    determining whether at least one loading stations on a first riser comprises materials to be conveyed;
    determining whether at least one additional loading station provided on a second riser comprises materials to be conveyed;
    generating an order in which the loading stations that comprise materials to be conveyed are to be emptied, and wherein the order comprises ordering loading stations on the first riser based on at least one of fill level, a user-input, a user-type, a predetermined station type, frequency of use, and a type of material, and wherein the loading stations comprising materials to be conveyed on the first riser are emptied prior to emptying loading stations on the second riser, wherein the emptying comprises:
    activating conveyance features of the first riser;
    opening inner doors of the loading stations of the first riser in a sequence until the at least one loading station of the first riser is cleared;
    deactivating the conveyance features of the first riser;
    activating conveyance features of the second riser; and
    deactivating the conveyance features of the second riser upon confirming that the loading station of the second riser has been cleared.

2. The method of claim 1, wherein the sequence comprises emptying lower stations and proceeding upwardly.

3. The method of claim 1, wherein the system generates a time stamp for each loading station when the loading station is provided with materials to be conveyed.

4. The method of claim 3, wherein the system assigns priority to at least one loading station based on at least one of fill level, a user-input, a user type, frequency of use of a station, and pre-programmed priority.

5. The method of claim 1, wherein the step of identifying loading stations that comprise materials to be conveyed comprises receiving information from at least one of a sensor and a user input.

6. A collection and transport system comprising:
    a plurality of vertically extending risers;
    wherein each of the plurality of risers comprises an air mover;
    transport piping connecting the risers and a central collection point;
    wherein at least one of the plurality of risers comprises a plurality of loading stations;
    a processor operable to receive information and determine loading stations that comprise materials to be conveyed to the central collection point and generate an order in which the plurality of loading stations are to be emptied, wherein the order is determined by at least one of fill level, a user-input, a user-type, a predetermined station type, frequency of use, and a type of material;
    wherein the step of generating the order further comprises grouping stations on a common riser;
    a controller operable to communicate with the air mover and a plurality of loading stations;
    wherein the processor and the controller are configured to generate and send the order in which a plurality of loading stations are to be emptied and the order comprises grouping loading stations on a single riser prior to emptying a station of a second riser.

7. The system of claim 6, further comprising a user-interface in communication with the processor and controller.

8. The system of claim 7, wherein the user-interface allows a user to manually assign a priority to at least one of a riser and a loading station.

9. The system of claim 6, wherein at least one of the plurality of risers extends vertically along a plurality of levels of a structure and a loading station is provided on each of the plurality of levels.

10. A method of enhancing the efficiency of a transport system, the method comprising:
    providing a system with at least a first riser and a second riser and wherein the first and second risers each comprise a plurality of loading stations, transport piping, and a common collection point;
    determining whether at least one loading station on each of the first and second risers comprises material to be conveyed;
    generating an order in which the loading stations of the first riser are to be emptied, and wherein the step of generating the order is based on at least one of fill level, a user-input, a user-type, a predetermined station type, frequency of use, and a type of material;
    generating an order in which loading stations of the second riser are to be emptied, and wherein the step of generating the order is based on at least one of fill level, a user-input, a user-type, a predetermined station type, frequency of use, and a type of material;
    wherein the step of generating the order further comprises grouping stations on a common riser;
    activating conveyance features of the first riser;
    emptying the loading stations of the first riser in sequence based on the order generated for the first riser;
    deactivating the conveyance features of the first riser upon confirming that the at least one loading station of the first riser comprising material has been cleared;
    activating conveyance features of the second riser;
    emptying the loading stations of the second riser in sequence based on the order generated for the second riser;
    deactivating the conveyance features of the second riser upon confirming that the at least one loading station of the second riser comprising material has been cleared.

11. The method of claim 10, wherein the loading stations of the system comprise an inner door and an outer door.

12. The method of claim 11, wherein the step of emptying the loading stations comprises opening the inner door and allowing materials to be drawn through the inner door.

13. The method of claim 12, wherein the step of emptying the loading stations comprises confirming that the outer door is closed prior to opening the inner door.

14. The method of claim 10, wherein the system generates a time stamp for each loading station when the loading station is provided with materials to be conveyed.

\* \* \* \* \*